(12) United States Patent  
Waisbard et al.

(10) Patent No.: US 9,124,929 B2
(45) Date of Patent: Sep. 1, 2015

(54) SECURE FAST CHANNEL CHANGING (75) Inventors: Erez Waisbard, Or-Yehuda (IL); Anna Schnaiderman, Jerusalem (IL)

(73) Assignee: Cisco Technology Inc., San Jose, CA (US)

( * ) Notice: Subject to any disclaimer, the term of this patent is extended or adjusted under 35 U.S.C. 154(b) by 90 days.

(21) Appl. No.: 14/002,174

(22) PCT Filed: May 15, 2012

(86) PCT No.: PCT/IB2012/052428
§ 371 (c)(1),
(2), (4) Date: Aug. 29, 2013

(87) PCT Pub. No.: WO2012/172442
PCT Pub. Date: Dec. 20, 2012

(65) Prior Publication Data
US 2013/0336482 A1 Dec. 19, 2013

(30) Foreign Application Priority Data

Jun. 16, 2011 (IL) .......................................... 21361 1
Dec. 19, 2011 (GB) .................................. 1121751.0

(51) Int. Cl.
*H04N 21/4408* (2011.01)
*H04N 21/418* (2011.01)
(Continued)

(52) U.S. Cl.
CPC ..... *H04N 21/4408* (2013.01); *H04N 21/26606* (2013.01); *H04N 21/26613* (2013.01); *H04N 21/4181* (2013.01); *H04N 21/4384* (2013.01); *H04N 21/4623* (2013.01)

(58) Field of Classification Search
USPC ......... 380/210, 200, 223, 239, 240, 277, 278, 380/279, 28, 268; 725/25, 31; 713/150, 189
See application file for complete search history.

(56) References Cited

U.S. PATENT DOCUMENTS 5,349,641 A 9/1994 Coutrot et al.
7,668,311 B2 2/2010 Kudelski et al.
(Continued)

FOREIGN PATENT DOCUMENTS

EP 1 705 915 A1 9/2006
EP 1 804 508 A1 7/2007
(Continued)

OTHER PUBLICATIONS

Aug. 31, 2012 Transmittal of International Search Report and Written Opinion of the International Searching Authority for PCT/IB2012/052428.

(Continued)

*Primary Examiner* — Brandon Hoffman
*Assistant Examiner* — Samuel Ambaye
(74) *Attorney, Agent, or Firm* — Hahn Loeser & Parks LLP (57) ABSTRACT

A method for communication, including distributing over a communication network multiple channels of digital content, which are encrypted using different, channel-specific control words, and transmitting over the communication network, different, channel-specific entitlement control messages from which the control words are derivable such that each of the different channel-specific control words is derivable from any of the different channel-specific entitlement control messages by authorized receivers of the channels on the communication network. Related methods and apparatus are also included.

18 Claims, 3 Drawing Sheets

(51) Int. Cl.
*H04N 21/438* (2011.01)
*H04N 21/4623* (2011.01)
*H04N 21/266* (2011.01)

(56) References Cited

U.S. PATENT DOCUMENTS

| | | | |
|---|---|---|---|
| 2003/0005435 A1* | 1/2003 | Nelger et al. | 725/31 |
| 2004/0120529 A1 | 6/2004 | Zhang et al. | |
| 2005/0238170 A1* | 10/2005 | Ksontini et al. | 380/268 |
| 2007/0150960 A1 | 6/2007 | Dubroeucq et al. | |
| 2009/0183196 A1 | 7/2009 | Chen et al. | |
| 2009/0285401 A1 | 11/2009 | Moroney et al. | |
| 2011/0219396 A1* | 9/2011 | Kudelski | 725/31 |

FOREIGN PATENT DOCUMENTS

| | | |
|---|---|---|
| EP | 2 207 340 A1 | 7/2010 |
| EP | 2 334 069 A1 | 6/2011 |
| WO | WO 01/56287 A2 | 8/2001 |
| WO | WO 2007/089107 A1 | 8/2007 |
| WO | WO 2010/079219 A1 | 7/2010 |

OTHER PUBLICATIONS

Apr. 26, 2012 Office Communication received in connection with prosecution of GB 1121751.0.

* cited by examiner

SECURE FAST CHANNEL CHANGING

RELATED APPLICATION INFORMATION

The present application is a 35 USC §371 application of PCT/IB2012/052428, filed on 15 May 2012 and entitled "Secure Fast Channel Changing", which was published on 20 Dec. 2012 in the English language with International Publication Number WO 2012/172442 and which relies for priority on Israel Patent Application 213611 filed 16 Jun. 2011 and UK Patent Application 1121751.0 filed 19 Dec. 2011.

FIELD OF THE INVENTION

The present invention relates generally to digital communications, and specifically to methods and systems for secure transmission and reception of digital content.

BACKGROUND OF THE INVENTION

Many digital video systems use conditional access (CA) in order to limit access to content consumption, for example, but not limited to, pay TV environment. CA generally requires the receiver to meet certain criteria before being able to decrypt and display a given content channel. The data stream transmitted for each channel is encrypted using a secret key, known as a control word (CW), which changes several times per minute. (This sort of encryption is commonly referred to as "scrambling.") The CW itself is provided by entitlement control messages (ECMs), which are transmitted several times per minute from the system head-end to receivers of the channel. The CA subsystem (such as a secure smart card) in each receiver processes the ECM to recover the CW for a given content channel, but only when the receiver is authorized by an entitlement management message (EMM) for the given channel. EMMs are typically transmitted periodically (for example, once per month) to the CA subsystem, depending on the subscriber's service plan.

As digital television transmission has replaced analog broadcasts, viewers have found that the advantages of the newer mode are offset by a relatively long latency period when changing channels, as compared to the nearly instant response of a traditional analog tuner. This latency is largely a consequence of motion-compensated video encoding schemes, such as MPEG-2. When the transmitted content is encrypted, as is common in satellite and cable television systems, CA-related operations carried out by the receiver for each new channel can add further latency.

A number of attempts have been made to address this issue. For example, PCT International Publication WO 2010/079219 describes a method for delivery of conditional access (CA) data to a receiver that is able to connect to a plurality of scrambled programs. Conditional access for a current channel is handled using standard ECMs delivered with the channel. In parallel, the receiver retrieves an ECM for a separate stream comprising control words for every channel. The control word of this ECM is used to descramble the separate stream to access the control words for every channel. Upon channel change, the relevant retrieved control word is used to descramble the new channel. This approach is said to enable a reduction or removal of the CA delay when switching between channels.

As another example, U.S. Pat. No. 7,668,311 describes a method for transmission of decrypting information using a combination of authorization information for a channel (ECM), which is encrypted by a fast algorithm, with authorization information (MECM) for a group of channels, which is encrypted by a high-security algorithm. At the moment of change from one channel to another, the information contained in the mono-channel authorization message (ECM) suitable for the new channel is combined with the information contained in the multi-channel authorization message (MECM) already in the cryptographic unit, which is common to the two channels.

US Patent Application 2009/0285401 of Moroney, et al. describes conditional access using EMMs and ECMs.

SUMMARY

Embodiments of the present invention that are described hereinbelow provide methods and systems for efficient cryptographic operation in multi-channel digital content distribution systems.

There is therefore provided, in accordance with an embodiment of the present invention, a method for communication, which includes distributing over a communication network multiple channels of digital content, which are encrypted using different, channel-specific control words. Different, channel-specific entitlement control messages, from which the control words are derivable, are transmitted over the communication network. Each of the different channel-specific control words is derivable from any of the different channel-specific entitlement control messages by authorized receivers of the channels on the communication network.

Additionally or alternatively, the method includes providing a master control word, from which each of the channel-specific control words is derivable, and the master control word is derivable from any of the channel-specific entitlement control messages. Typically, each of the channel-specific entitlement control messages includes a respective message body, which is processed by the authorized receivers using a predefined function to give a respective interim result, and a respective correction value, which is computed so that application of the respective correction value to the respective interim result gives the master control word.

Additionally or alternatively, the method includes receiving a channel-specific entitlement control message over the network for a first channel, processing the channel-specific entitlement control message to derive the master control word, receiving an instruction to switch to a second channel, different from the first channel, processing the master control word to derive a channel-specific control word for the second channel, and decrypting the digital content of the second channel using the channel-specific control word.

In a disclosed embodiment, the method includes providing respective channel keys for the multiple channels, wherein the channel-specific control words are derived by the authorized receivers by application of the channel keys to the master control word. Providing the channel keys may include transmitting respective channel-specific entitlement management messages containing the respective channel keys for the multiple channels.

In some embodiments, transmitting the channel-specific entitlement control messages includes transmitting a respective new channel-specific entitlement control message in each of a sequence of crypto-periods, wherein new channel-specific control words are derivable for each of the channels from the new channel-specific entitlement control message.

There is also provided, in accordance with an embodiment of the present invention, a method for communication, which includes receiving multiple channels of digital content, which are encrypted using different, channel-specific control words, over a communication network. Different, channel-specific entitlement control messages are received over the network for the multiple channels such that each of the different channel-specific control words is derivable from any of the different channel-specific entitlement control messages by authorized receivers of the channels on the communication network. A channel-specific entitlement control message of any given channel among the multiple channels is processed in order to derive a channel-specific control word for the given channel. The digital content of the given channel is decrypted using the channel-specific control word.

In some embodiments, the method includes receiving an instruction to switch to a new channel after deriving a first control word from the channel-specific entitlement control message received for the given channel, processing the first control word to derive the channel-specific control word for the new channel, and decrypting the digital content of the new channel using the channel-specific control word of the new channel. The method may include receiving a new channel-specific entitlement control message for the new channel after deriving the channel-specific control word for the new channel from the first control word, and processing the new channel-specific entitlement control message to derive a new channel-specific control word for the new channel. In a disclosed embodiment, receiving the new channel-specific entitlement control messages includes receiving a respective new channel-specific entitlement control message in each of a sequence of crypto-periods, wherein new channel-specific control words are derivable for each of the channels from the new channel-specific entitlement control message in each crypto-period.

In some embodiments, processing the channel-specific entitlement control message includes deriving from the channel-specific entitlement control message a master control word, which is common to the multiple channels, and processing the master control word to derive the channel-specific control word for the given channel. Typically, processing the master control word includes receiving a channel key for the given channel, and processing the master control word using the channel key to derive the channel-specific control word. Receiving the channel key may include receiving over the network respective channel-specific entitlement management messages for the multiple channels. It is desirable that neither the master control word nor the channel key can be derived from the channel-specific control word.

Additionally or alternatively, decrypting the channel-specific entitlement control message includes passing the entitlement control message from a receiver of the digital content to a smart card associated with the receiver, wherein the smart card derives the master control word and processes the master control word so as to output the channel-specific control word to the receiver for use in decrypting the digital content, without revealing the master control word to the receiver.

There is additionally provided, in accordance with an embodiment of the present invention, communication apparatus, including a communication interface and a head-end processor, which is configured to distribute over a communication network via the communication interface multiple channels of digital content, which are encrypted using different, channel-specific control words. The head-end processor transmits over the communication network, different, channel-specific entitlement control messages from which the control words are derivable by authorized receivers of the channels on the communication network such that each of the different channel-specific control words is derivable from any of the different channel-specific entitlement control messages by the authorized receivers of the channels on the communication network.

There is further provided, in accordance with an embodiment of the present invention, communication apparatus, including a communication interface, which is configured to receive multiple channels of digital content, which are encrypted using different, channel-specific control words, over a communication network, and to receive different, channel-specific entitlement control messages over the network for the multiple channels such that each of the different channel-specific control words is derivable from any of the different channel-specific entitlement control messages by authorized receivers of the channels on the communication network. A processor is configured to process a channel-specific entitlement control message of any given channel among the multiple channels in order to derive a channel-specific control word for the given channel. A media generator is configured to decrypt the digital content of the given channel using the channel-specific control word.

There is moreover provided, in accordance with an embodiment of the present invention, a security module for use in a receiver, which is configured to receive and decrypt multiple channels of digital content, which are encrypted using different, channel-specific control words, over a communication network. The module includes a memory and a processor, which is configured to receive different, channel-specific entitlement control messages sent over the network for the multiple channels, to process a channel-specific entitlement control message of any given first channel among the multiple channels in order to derive a first control word, to store the first control word in the memory, and to process the first control word to derive and output a channel-specific control word for any given second channel among the multiple channels for use by the receiver in decrypting the digital content of the second channel.

The present invention will be more fully understood from the following detailed description of the embodiments thereof, taken together with the drawings in which:

DETAILED DESCRIPTION OF EMBODIMENTS

In CA-enabled digital video transmission systems, such as satellite and cable TV systems, each channel typically has its own ECM, different and independent from those of other channels. When a user switches to a new channel (referred to as "zapping"), the receiver must tune to the new channel, acquire the new channel ECM, and apply the necessary cryptographic operations to derive the CW for the new channel. Only then can the receiver begin to decrypt and display the content in the new channel. Typically, the ECM for each channel is transmitted once every 100 ms, and complex cryptographic operations (which are generally performed in a secure smart card) are required to derive the control word. The inventors have found that the above steps add a latency of 200-300 ms to the already lengthy time required for channel switching.

Embodiments of the present invention that are described hereinbelow seek to reduce this latency by enhancing the speed of computation of the CW for the new channel upon channel switching. This enhanced speed is achieved by defining the channel-specific control words in such a way that each of the channel-specific control words is derivable from any channel specific ECM by authorized receivers (i.e., receivers having the necessary key). For this purpose, in the disclosed embodiments, a master control word (MCW) is defined, from which each of the channel-specific CWs is derivable by the authorized receivers. Different, channel-specific ECMs are still transmitted for each of the different channels over the communication network, since these different ECMs are needed for other access control functions; and the CWs are different and independent, such that a hacker cannot readily derive one CW from another. The MCW, however, can be derived by processing of any of the ECMs.

Using this approach, upon switching channels, a receiver can use the MCW that it derived from the ECM received for one channel to rapidly generate the CW for the new channel. This method of CW computation uses a simple cryptographic procedure (typically carried out in the smart card) and eliminates the need for the receiver to wait to receive a new ECM for the new channel and then pass the ECM to the smart card for processing. The inventors have found that this approach reduces the latency of starting decryption of the digital content for the new channel to about 100 ms.

As described above channel specific CWs and channel specific ECMs are typically different for each channel. However, a channel-specific ECM and a channel specific CW could be the same for more than one channel. By way of example only, a first channel specific ECM could be specific for channels 1, 2 and 3 while a second channel specific ECM could be specific for channels 4, 5 and 6. Channels 1, 2 and 3 could also share a first CW while channels 4, 5 and 6 could share a second CW. Alternatively, some of channels could have different ECMs while still sharing the same CW (typically in a case when the channels share a common access criterion, for example, the movies are bundled for Pay-TV purposes).

Figure 1:
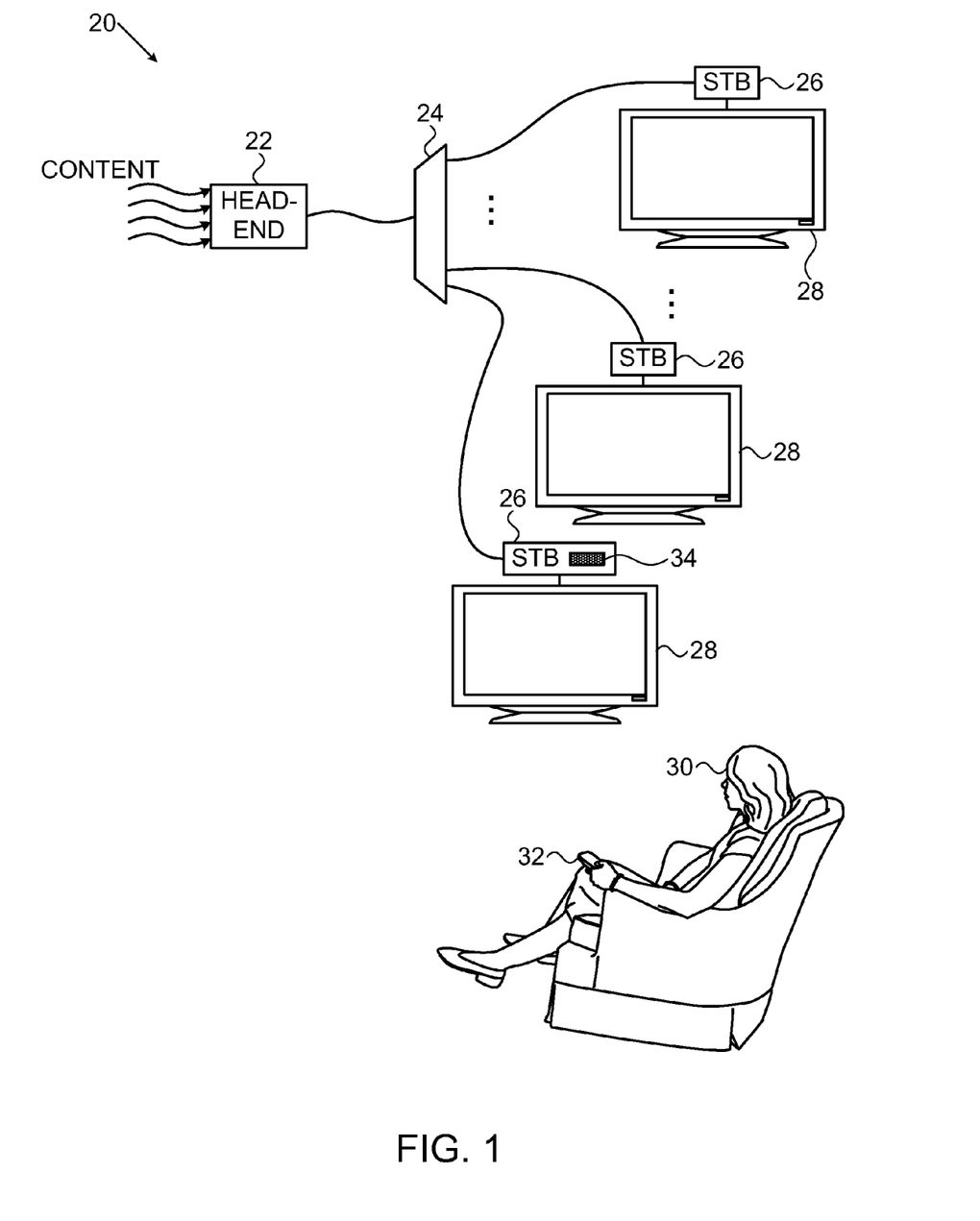
FIG. 1 is a schematic, pictorial illustration of a content distribution system, in accordance with an embodiment of the present invention.

FIG. 1 is a schematic, pictorial illustration of a video distribution system 20, in accordance with an embodiment of the present invention. A head-end processor 22 transmits multiple channels of content via a communication interface 24 over a network to multiple subscribers 30. The network may comprise, for example, a cable entertainment network, a satellite network, a packet network (such as wired and/or wireless Internet), or any other suitable type of data communication network or combination of such networks that is known in the art. Head-end processor 22 transmits the content for each channel in the form of encoded video, in accordance with any suitable encoding method. Typically, head-end processor 22 and interface 24 comprise industry-standard head-end equipment, which is modified in software to use and transmit the novel type of ECM that is described below.

Some or all of the channels transmitted in system 20 are typically encrypted and may be accessed by the subscribers only in accordance with CA constraints. For this purpose, head-end processor 22 transmits channel-specific ECMs for each channel at regular intervals (typically in the order of 100 ms, as noted above). The ECM and CW for each channel typically change periodically, for example every 10 sec (an interval of time referred to as a "crypto-period").

The term "encoded" is used throughout the present specification and claims, in all of its grammatical forms, to refer to any type of data stream encoding including, for example and without limiting the scope of the definition, well known types of encoding such as, but not limited to, MPEG-2 encoding, H.264 encoding, VC-1 encoding, and synthetic encodings such as Scalable Vector Graphics (SVG) and LASER (ISO/IEC 14496-20), and so forth. It is appreciated that an encoded data stream generally requires more processing and typically more time to read than a data stream which is not encoded. Any recipient of encoded data, whether or not the recipient of the encoded data is the intended recipient, is, at least in potential, able to read encoded data without requiring cryptanalysis. It is appreciated that encoding may be performed in several stages and may include a number of different processes, including, but not necessarily limited to: compressing the data; transforming the data into other forms; and making the data more robust (for instance replicating the data or using error correction mechanisms).

The term "compressed" (though not used explicitly in the present specification and claims), in all of its grammatical forms, refers to any type of data stream compression. Compression is typically a part of encoding and may include image compression and motion compensation. Typically, compression of data reduces the number of bits comprising the data. In that compression is a subset of encoding, the terms "encoded" and "compressed", in all of their grammatical forms, are often used interchangeably throughout the present specification and claims.

Similarly, the terms "decoded" and "decompressed," to the extent used in the present specification and claims, in all their grammatical forms, refer to the reverse of "encoded" and "compressed" in all their grammatical forms.

The terms "scrambled" and "encrypted," in all of their grammatical forms, are used interchangeably throughout the present specification and claims to refer to any appropriate scrambling and/or encryption methods for scrambling and/or encrypting a data stream, and/or any other appropriate method for intending to make a data stream unintelligible except to an intended recipient(s) thereof. Well known types of scrambling or encrypting include, but are not limited to DES, 3DES, and AES. Similarly, the terms "descrambled" and "decrypted" are used throughout the present specification and claims, in all their grammatical forms, to refer to the reverse of "scrambled" and "encrypted" in all their grammatical forms.

Pursuant to the above definitions, the terms "encoded"; "compressed"; and the terms "scrambled" and "encrypted" are used to refer to different and exclusive types of processing. Thus, a particular data stream may be, for example:

encoded, but neither scrambled nor encrypted;

compressed, but neither scrambled nor encrypted;

scrambled or encrypted, but not encoded;

scrambled or encrypted, but not compressed;

encoded, and scrambled or encrypted; or compressed, and scrambled or encrypted.

Likewise, the terms "decoded" and "decompressed" on the one hand, and the terms "descrambled" and "decrypted" on the other hand, are used to refer to different and exclusive types of processing.

Each ECM is a bit string having the following general form:

| Correction value | ECM body | Signature |
|---|---|---|

The ECM body is the main part of the ECM and includes the ECM headers and payload. Processing of the ECM body, using a predefined function, gives a certain interim result. The correction value is pre-computed so that application of this correction value to the interim result will give the desired MCW. In other words, if H is the processing function, CV is the correction value, and $\oplus$ represents the operation (for example, XOR) used in applying the correction value to the interim result, then for any given channels 1 and 2:

$$H(ECM_1) \oplus CV_1 = H(ECM_2) \oplus CV_2 = MCW.$$

The signature is calculated over the entire ECM (excluding the signature field itself) and is used by the receiver to verify the authenticity and correctness of the ECM.

In "Simulcrypt" systems, a given channel may have multiple different ECMs. In this case, each of the ECMs has its own correction value, so that all of them map to the same MCW in the manner shown above.

In an alternative embodiment, the ECM body comprises a shared part, which is common to all channels, and a channel-specific part for each different channel. The MCW is computed by applying the processing function H only to the shared part of the ECM. In this case, the correction value is not needed.

Each subscriber 30 receives the encoded content from the network in a receiver 26 with decryption capabilities, as described below. In the pictured embodiment, receiver 26 has the form of a television set-top box (STB), which decodes the video content in order to output a series of video frames to a television monitor 28. Subscriber 30 selects channels to view using a control 32, which instructs receiver 26 to make the desired channel changes. A security module in receiver 26, such as a smart card 34, receives the ECMs transmitted by head-end processor 22 and generates the CWs to be used by the receiver in decrypting the selected channels. Details of these operations are described below.

Receivers 26 may alternatively comprise any suitable sort of video decoder and may be implemented either as free-standing units, as shown in the figure, or in the form of embedded processing circuitry within a display device, such as a computer, entertainment console, or mobile media player. Furthermore, although the disclosed embodiments focus on video distribution, it will be appreciated that those ordinarily skilled in the art that the principles of the systems and methods described herein may similarly be applied to distribution of substantially any type of media content, such as audio and/or textual media.

Figure 2:
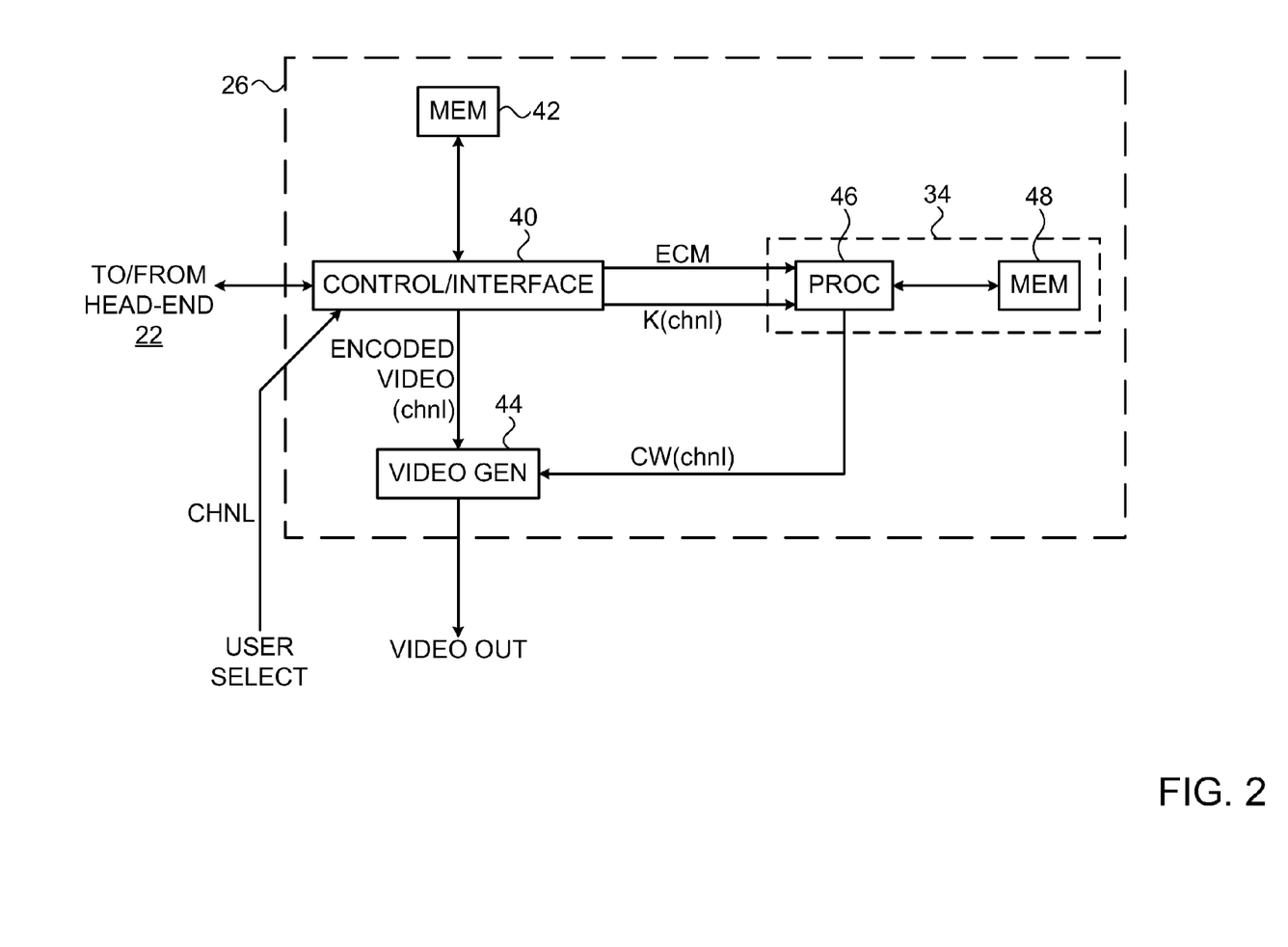
FIG. 2 is a block diagram that schematically illustrates a digital video receiver, in accordance with an embodiment of the present invention.

FIG. 2 is a block diagram that schematically shows details of receiver 26, in accordance with an embodiment of the present invention. Receiver 26 comprises processing circuitry, including a network interface and control unit 40 (referred to hereinafter for brevity simply as controller 40) and a memory 42. Controller 40 receives signals over the network from head-end processor 22. These signals typically include both encrypted video and CA-related messages.

Controller 40 passes the CA-related message information to smart card 34, including the above-mentioned ECMs, as well as channel keys K(chnl for the channels of interest. These channel keys may, for example, be carried by EMMs, which are transmitted to receiver 26 periodically (for example, once per month) or at irregular intervals for each channel that subscriber 30 is authorized to receive. In alternative embodiments, the channel keys:
- may be constant;
- may vary inherently over time (for example, as a function of the channel number and the crypto-period or some other counter); or
- may be updated by network transmission, but less frequently than a typical EMM.

In any case, a channel key for a channel is changed less frequently than control words for that channel. Channel keys for a given channel may have a hidden relation. For example, previous channel keys for the same channel may be derived using hash chain techniques. This sort of relation is useful in playing back recorded content.

Smart card 34 comprises a processor 46 and a memory 48, which stores encryption keys. Processor 46 applies the sort of cryptographic operation described above to the ECMs that it receives in order to generate the MCW. It then combines the MCW with the channel key K(chnl for each channel selected by subscriber 30 in order to generate the CW for that channel. The MCW is typically stored securely in memory 48 and is not accessible to other elements of receiver 26. In other words, processor 46 in smart card 34 derives the MCW and processes the MCW so as to output the channel-specific CW to receiver 26 without revealing the MCW to the receiver.

Controller 40 passes encrypted video that it receives for the selected channel to a media generator, such as a video generator circuit 44. The video generator circuit decrypts the encoded video using the CW provided by smart card 34 and generates a series of standard video frames for output to monitor 28. When subscriber 30 chooses a new channel, controller 40 tunes to the new channel and requests the corresponding new CW from smart card 34. When the CW is ready and the new video stream reaches an appropriate point to begin decoding (such as an I-frame), video generator circuit 44 begins to decrypt and display the new channel.

The elements of the processing circuitry in receiver 26 that are illustrated in FIG. 2—controller 40, video generator circuit 44, and smart card 34—are shown as separate functional components for the sake of conceptual clarity. In practice, some or all of the functions of these elements may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to receiver 26 in electronic form, over a network, for example. Alternatively or additionally, the software may be stored in tangible, non-transitory computer-readable storage media, such as optical, magnetic, or electronic memory.

Figure 3:
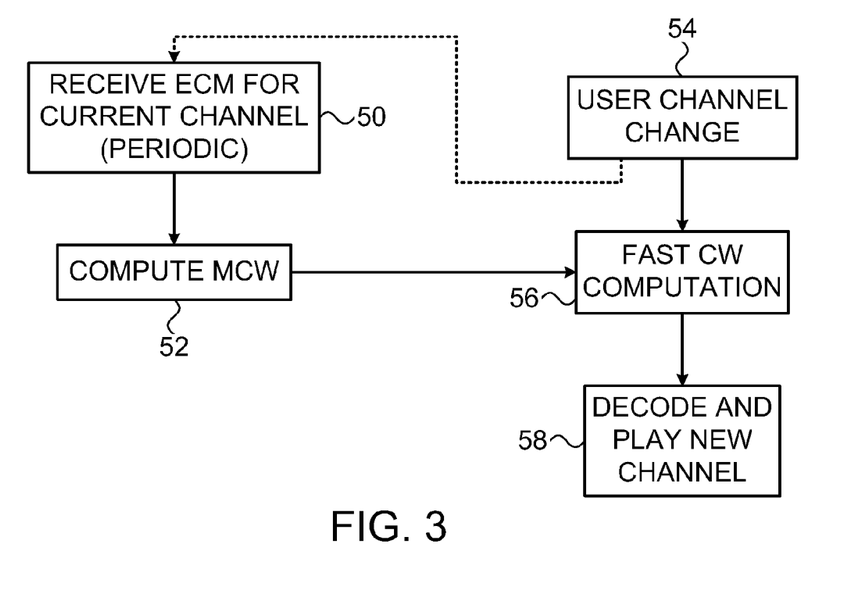
FIG. 3 is a flow chart that schematically illustrates a method for channel change, in accordance with an embodiment of the present invention.

FIG. 3 is a flow chart that schematically illustrates a method for channel change by receiver 26, in accordance with an embodiment of the present invention. While the receiver is tuned to a given channel, controller 40 periodically (once every 100 ms, for example) receives the ECM for this channel, at an ECM reception step 50. At certain intervals, known as crypto-periods, the ECM value changes, as does the corresponding CW. In embodiments of the present invention, these crypto-periods are typically (but not necessarily) synchronized among the different channels transmitted over system 20.

Controller 40 passes each ECM that it receives to processor 46 in smart card 34. Processor 46 in the smart card uses the ECM to compute the MCW, as described above, at a MCW computation step 52. The computation uses the general formula:

$$H(ECM_{chnl}) \oplus CV_{chnl} = MCW,$$

wherein the "chnl" subscript refers to the current channel. This MCW computation is repeated periodically, so that the MCW is up to date in each crypto-period regardless of the channel to which the receiver is tuned. When the crypto-periods are unsynchronized, processor 46 may maintain two (or more) MCW values in memory 48 and will then choose the appropriate value for CW computation depending on the crypto-period of the channel involved.

Receiver 26 receives an instruction from subscriber 30 to switch to a new channel, at a channel changing step 54. Upon receiving this instruction, controller 40 requests the CW for the new channel from smart card 34. In response to the request, processor 46 reads the appropriate MCW from memory 48 (taking into account differences in crypto-periods if necessary), and computes the channel-specific control word CW(chnl), at a CW computation step 56. Details of this process are shown below in FIG. 4. The fast CW computation at step 56 is asynchronous and temporally independent of receiving the ECM and computing the MCW at steps 50 and 52. (In other words, once the MCW has been computed for a given crypto-period, it can be used at any time within the crypto-period in the fast CW computation.) This fast CW computation is generally computationally "lighter" than conventional CW computation and than MCW computation.

Video generator circuit 44 receives the channel-specific CW from smart card 34, and uses the CW to decrypt and play the new channel, at a decoding step 58. Processor 46, meanwhile continues receiving new ECMs from the new channel at step 50 and processes these ECMs to continually update the MCW at step 52. This MCW may be used in the same manner as the previous one to derive the next channel-specific CW when needed at step 56.

Figure 4:
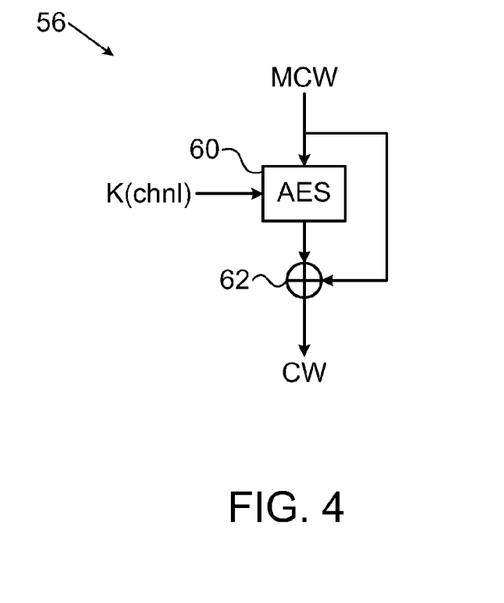
FIG. 4 is a block diagram that schematically illustrates a method for control word computation, in accordance with an embodiment of the present invention.

FIG. 4 is a block diagram that schematically illustrates a method for control word computation at step 56, in accordance with an embodiment of the present invention. The computation for a given channel uses the MCW and the channel-specific key K(chnl), which processor 46 has extracted from the latest EMM that was received for the given channel. Both the MCW and key are stored in memory 48 and retrieved by the processor as needed. The processor applies a one-way hash function, such as using Advanced Encryption Standard (AES) encryption (or decryption) 60, with an XOR operation 62, to the MCW using the key in order to derive the channel-specific CW value. Since this computation is performed using information (the MCW and the EMM key) that was stored by processor 46 in memory 48 before the channel switch was invoked at step 54 (FIG. 3), the processor does not have to wait for or extract any further information from the incoming data stream from the network before generating the CW.

For the sake of convenience and clarity, the specification and claims of this patent application use terminology that is commonly accepted in current CA video systems, such as control word (CW), entitlement control message (ECM), and entitlement management message (EMM). The principles of the present invention, however, are by no means limited to the specific sorts of CA systems that use these terms, but rather extend to systems of other sorts, which may use different terminology to relate to components that are functionally similar to these CA system elements. The CA-related terminology that is used in the claims should therefore be understood broadly to refer to equivalent elements in all sorts of user-selectable, controlled-access, multi-channel digital communication and content distribution systems.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
distributing over a communication network multiple channels of digital content, which are encrypted using different, channel-specific control words; and
transmitting over the communication network, different, channel-specific entitlement control messages from which the control words are derivable such that each of the different channel-specific control words is derivable from any of the different channel-specific entitlement control messages by authorized receivers of the channels on the communication network, wherein: (a) a first channel-specific control word for a first channel is derivable from a channel key for the first channel and a master control word which is derivable from a first channel-specific entitlement control message for the first channel; and (b) a second channel-specific control word for a second channel is derivable from a channel key for the second channel and the master control word in the absence of the first channel-specific control word.

2. The method according to claim 1, further comprising providing the master control word, from which each of the channel-specific control words is derivable, and wherein the master control word is derivable from any of the channel-specific entitlement control messages.

3. The method according to claim 2, wherein each of the channel-specific entitlement control messages comprises:
a respective message body, which is processed by the authorized receivers using a predefined function to give a respective interim result; and
a respective correction value, which is computed so that application of the respective correction value to the respective interim result gives the master control word.

4. The method according to claim 2, comprising:
receiving a channel-specific entitlement control message over the network for the first channel;
processing the channel-specific entitlement control message to derive the master control word;
receiving an instruction to switch to the second channel, different from the first channel;
processing the master control word to derive a channel-specific control word for the second channel; and
decrypting the digital content of the second channel using the channel-specific control word.

5. The method according to claim 2, comprising providing respective channel keys for the multiple channels, wherein the channel-specific control words are derived by the authorized receivers by application of the channel keys to the master control word.

6. The method according to claim 5, wherein providing the channel keys comprises transmitting respective channel-specific entitlement management messages containing the respective channel keys for the multiple channels.

7. The method according to claim 1, wherein transmitting the channel-specific entitlement control messages comprises transmitting a respective new channel-specific entitlement control message in each of a sequence of crypto-periods, wherein new channel-specific control words are derivable for each of the channels from the new channel-specific entitlement control message.

8. A method for communication, comprising:
receiving multiple channels of digital content, which are encrypted using different, channel-specific control words, over a communication network;
receiving different, channel-specific entitlement control messages over the network for the multiple channels such that each of the different channel-specific control words is derivable from any of the different channel-specific entitlement control messages by authorized receivers of the channels on the communication network, wherein: (a) a first channel-specific control word for a first channel is derivable from a channel key for the first channel and a master control word which is derivable from a first channel-specific entitlement control message for the first channel; and (b) a second channel-specific control word for a second channel is derivable from a channel key for the second channel and the master control word in the absence of the first channel-specific control word;
processing a channel-specific entitlement control message of any given channel among the multiple channels in order to derive a channel-specific control word for the given channel; and
decrypting the digital content of the given channel using the channel-specific control word.

9. The method according to claim 8, comprising:
receiving an instruction to switch to a new channel after deriving a first control word from the channel-specific entitlement control message received for the given channel;
processing the first control word to derive the channel-specific control word for the new channel; and
decrypting the digital content of the new channel using the channel-specific control word of the new channel.

10. The method according to claim 9, comprising:
receiving a new channel-specific entitlement control message for the new channel after deriving the channel-specific control word for the new channel from the first control word; and
processing the new channel-specific entitlement control message to derive a new channel-specific control word for the new channel.

11. The method according to claim 10, wherein receiving the new channel-specific entitlement control messages comprises receiving a respective new channel-specific entitlement control message in each of a sequence of crypto-periods, wherein new channel-specific control words are derivable for each of the channels from the new channel-specific entitlement control message in each crypto-period.

12. The method according to claim 8, wherein processing the channel-specific entitlement control message comprises deriving from the channel-specific entitlement control message the master control word, which is common to the multiple channels, and processing the master control word to derive the channel-specific control word for the given channel.

13. The method according to claim 12, wherein processing the master control word comprises:
receiving a channel key for the given channel; and
processing the master control word using the channel key to derive the channel-specific control word.

14. The method according to claim 13, wherein receiving the channel key comprises receiving over the network respective channel-specific entitlement management messages for the multiple channels.

15. The method according to claim 13, wherein neither the master control word nor the channel key can be derived from the channel-specific control word.

16. The method according to claim 12, wherein decrypting the channel-specific entitlement control message comprises passing the entitlement control message from a receiver of the digital content to a smart card associated with the receiver, and wherein the smart card derives the master control word and processes the master control word so as to output the channel-specific control word to the receiver for use in decrypting the digital content, without revealing the master control word to the receiver.

17. Communication apparatus, comprising:
a communication interface; and
a head-end processor, which is configured to distribute over a communication network via the communication interface multiple channels of digital content, which are encrypted using different, channel-specific control words, and to transmit over the communication network, different, channel-specific entitlement control messages from which the control words are derivable by authorized receivers of the channels on the communication network such that each of the different channel-specific control words is derivable from any of the different channel-specific entitlement control messages by the authorized receivers of the channels on the communication network, wherein: (a) a first channel-specific control word for a first channel is derivable from a channel key for the first channel and a master control word which is derivable from a first channel-specific entitlement control message for the first channel; and (b) a second channel-specific control word for a second channel is derivable from a channel key for the second channel and the master control word in the absence of the first channel-specific control word.

18. Communication apparatus, comprising:
a communication interface, which is configured to receive multiple channels of digital content, which are encrypted using different, channel-specific control words, over a communication network and to receive different, channel-specific entitlement control messages over the network for the multiple channels such that each of the different channel-specific control words is derivable from any of the different channel-specific entitlement control messages by authorized receivers of the channels on the communication network, wherein: (a) a first channel-specific control word for a first channel is derivable from a channel key for the first channel and a master control word which is derivable from a first channel-specific entitlement control message for the first channel; and (b) a second channel-specific control word for a second channel is derivable from a channel key for the second channel and the master control word in the absence of the first channel-specific control word;
a processor, which is configured to process a channel-specific entitlement control message of any given channel among the multiple channels in order to derive a channel-specific control word for the given channel; and
a media generator, which is configured to decrypt the digital content of the given channel using the channel-specific control word.

* * * * *